Nov. 2, 1937.  A. PERRETON  2,097,639
MACHINE FOR CUTTING COMB HONEY
Filed Dec. 30, 1935  5 Sheets-Sheet 4
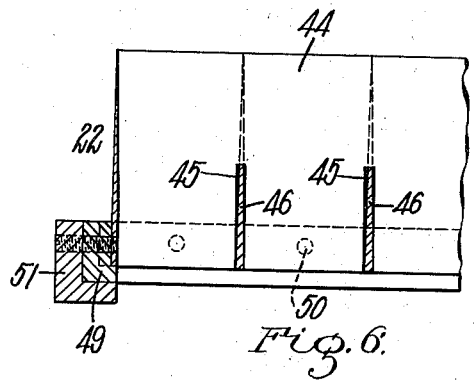
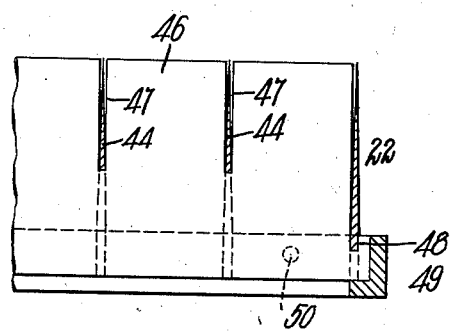
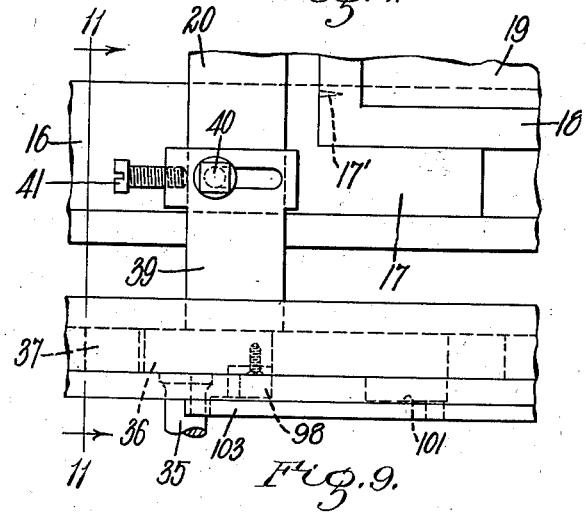
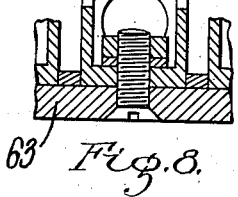
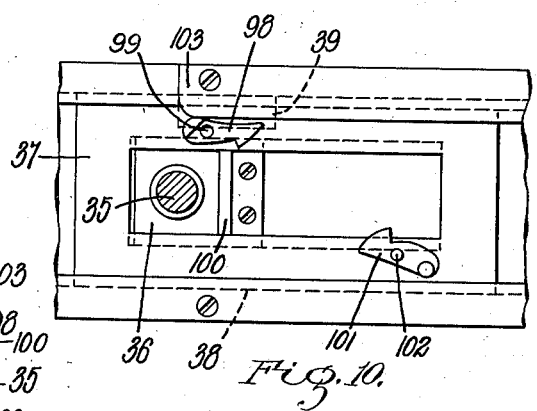
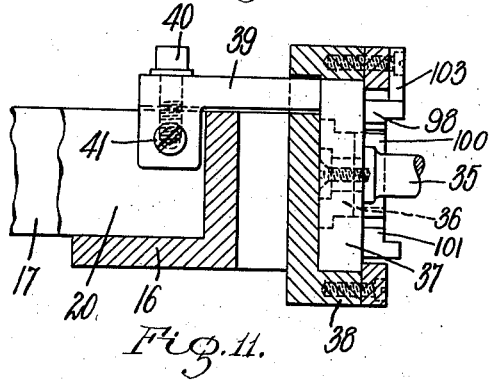
Inventor:
Arnold Perreton
by Franklin E. Low
Atty.

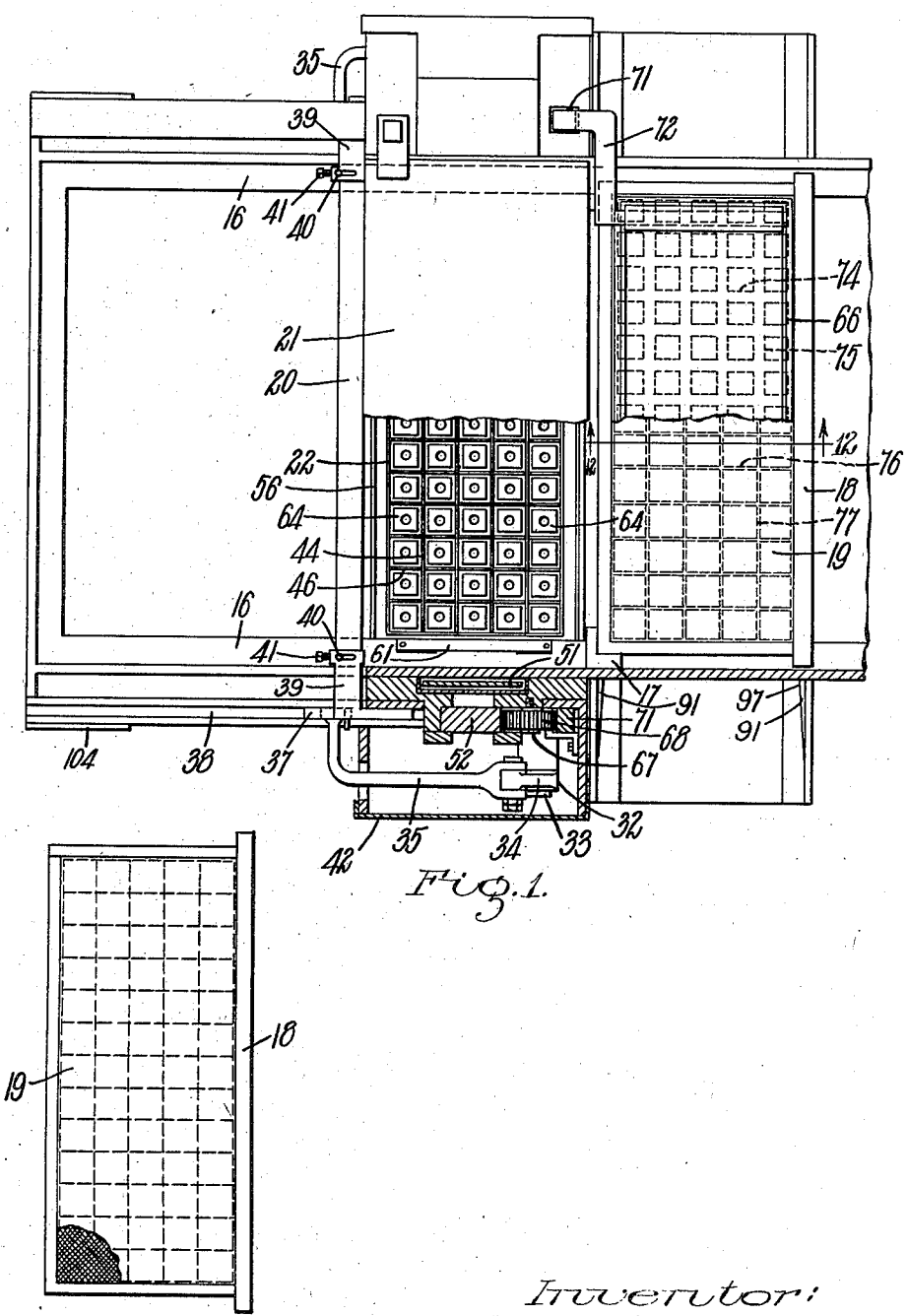

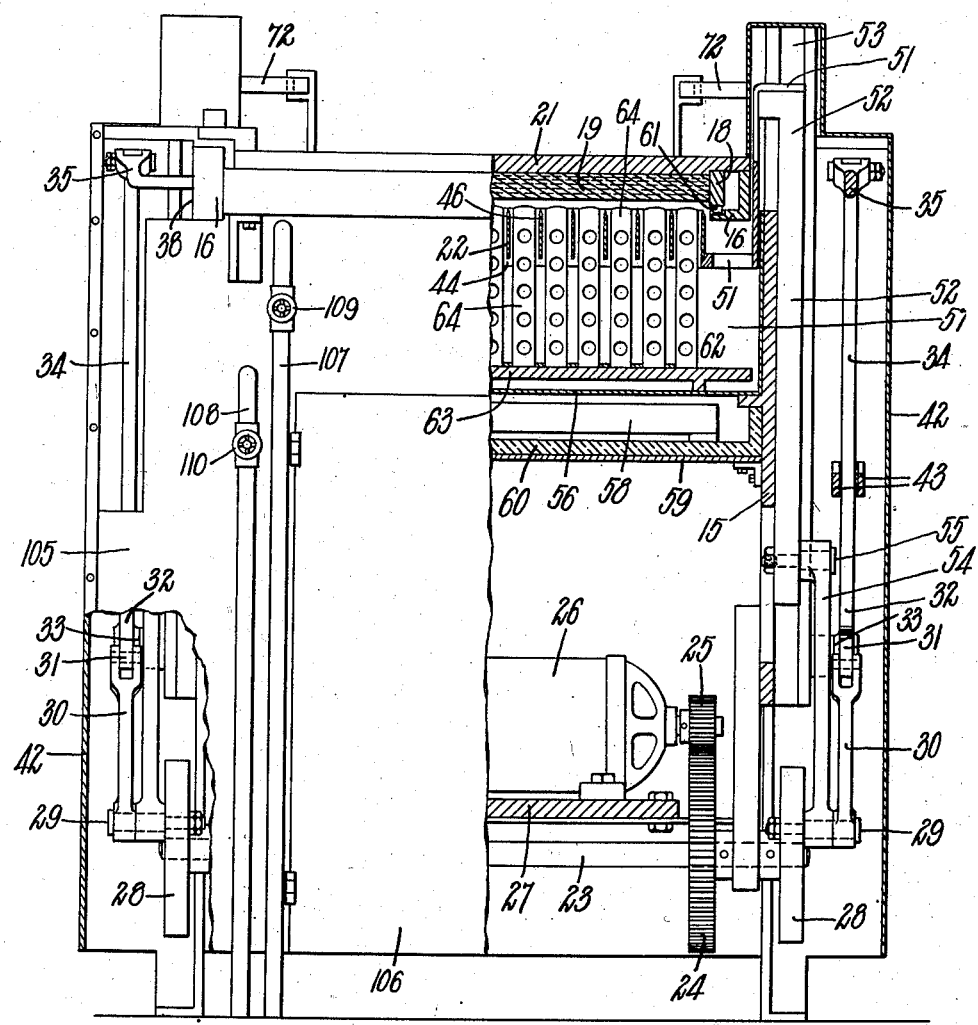

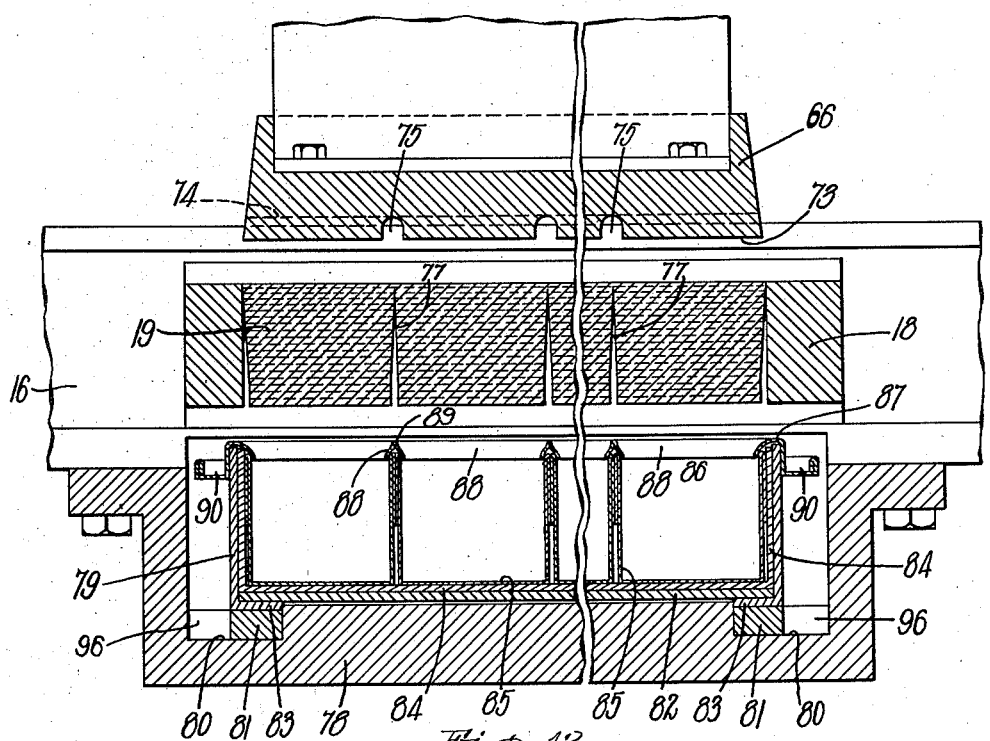
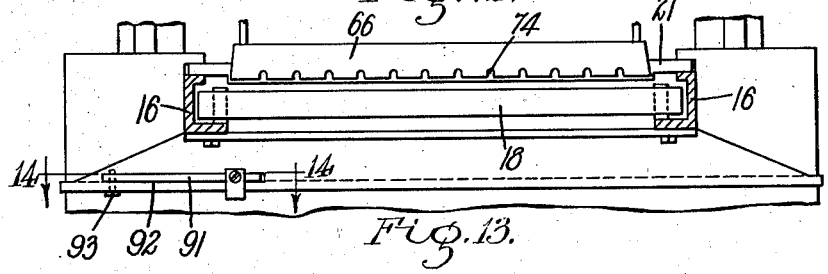
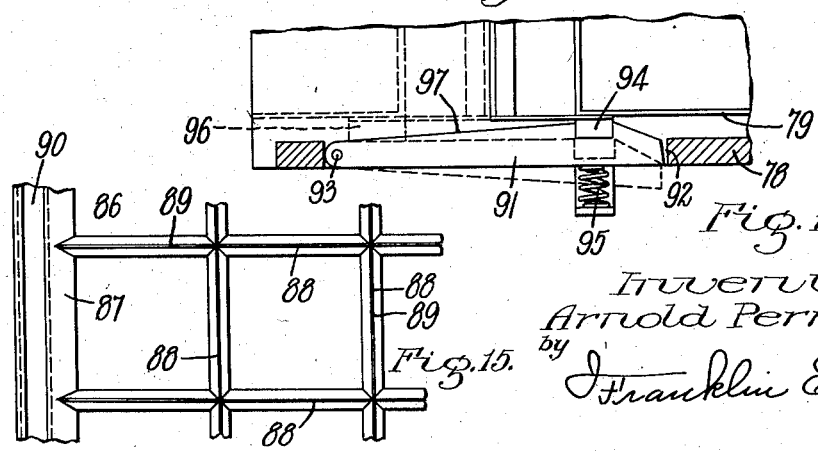

Patented Nov. 2, 1937

2,097,639

UNITED STATES PATENT OFFICE 2,097,639

MACHINE FOR CUTTING COMB HONEY

Arnold Perreton, Durham, N. H.

Application December 30, 1935, Serial No. 56,647

20 Claims. (Cl. 107—21)

This invention relates to a machine for cutting and packing comb honey, particularly comb honey located in frames as received from the bee hive.

The primary object of the invention is to provide a simple and practical machine for severing comb honey within its frame as received from the hive into relatively small pieces, and depositing said pieces into individual receptacles in order that they may be used eventually for individual servings.

Another object of the invention is to render the cutting action of the knife blades more effective by heating said blades with a hot fluid, preferably hot water, in which the blades are submerged between each cutting operation.

Another object of the invention is to provide a novel means for individually supporting partly severed pieces of comb honey within their frame while the knife blades are being withdrawn therefrom from beneath.

Still another object of the invention is to provide a novel means for ejecting partly severed pieces of comb honey en masse from their frame and then entirely severing said pieces one from another and depositing the pieces into individual receptacles.

The invention consists in a machine for cutting and packing comb honey as set forth in the following specification and particularly as pointed out in the claims.

Referring to the drawings:

Fig. 1 represents a plan view of a machine for cutting and packing comb honey embodying my invention, certain portions thereof being broken away to expose other portions located therebeneath.

Fig. 2 is a plan view of a honey comb frame filled with comb honey, a portion of which is broken away to illustrate the cells thereof.

Fig. 4 is a partial front elevation and partial central vertical section of the machine.

Fig. 5 is an enlarged detail sectional elevation illustrating a honey comb frame forced upwardly to contact the upper face of the comb honey therein with the under face of the cutting plate.

Figs. 6 and 7 are detail views illustrating the knife construction.

Fig. 8 is an enlarged central vertical section of one of the supporting units of the multiple support for the partly severed pieces of comb honey.

Fig. 9 is an enlarged plan view of a portion of the feeding mechanism for the honey comb frame.

Fig. 10 is a side elevation of the mechanism illustrated in Fig. 9 and particularly disclosing the main and idler slides and their locking mechanism.

Fig. 11 is a sectional elevation taken on the line 11—11 of Fig. 9, looking in the direction of the arrows on said line.

Fig. 12 is an enlarged detail sectional elevation as taken on the line 12—12 of Fig. 1, illustrating a frame filled with partly severed pieces of comb honey positioned beneath the ejector and above the group of nested receptacles into which said honey is eventually deposited by said ejector.

Fig. 13 is a vertical sectional elevation taken on the line 13—13 of Fig. 3, looking in the direction of the arrows on said line.

Fig. 14 is an enlarged detail sectional plan view as taken on the line 14—14 of Fig. 13 and illustrating the mechanism for locking the trays in position to receive the comb honey.

Fig. 15 is an enlarged detail plan view of a portion of the separator member.

Like numerals refer to like parts throughout the several views of the drawings.

Figure 3:
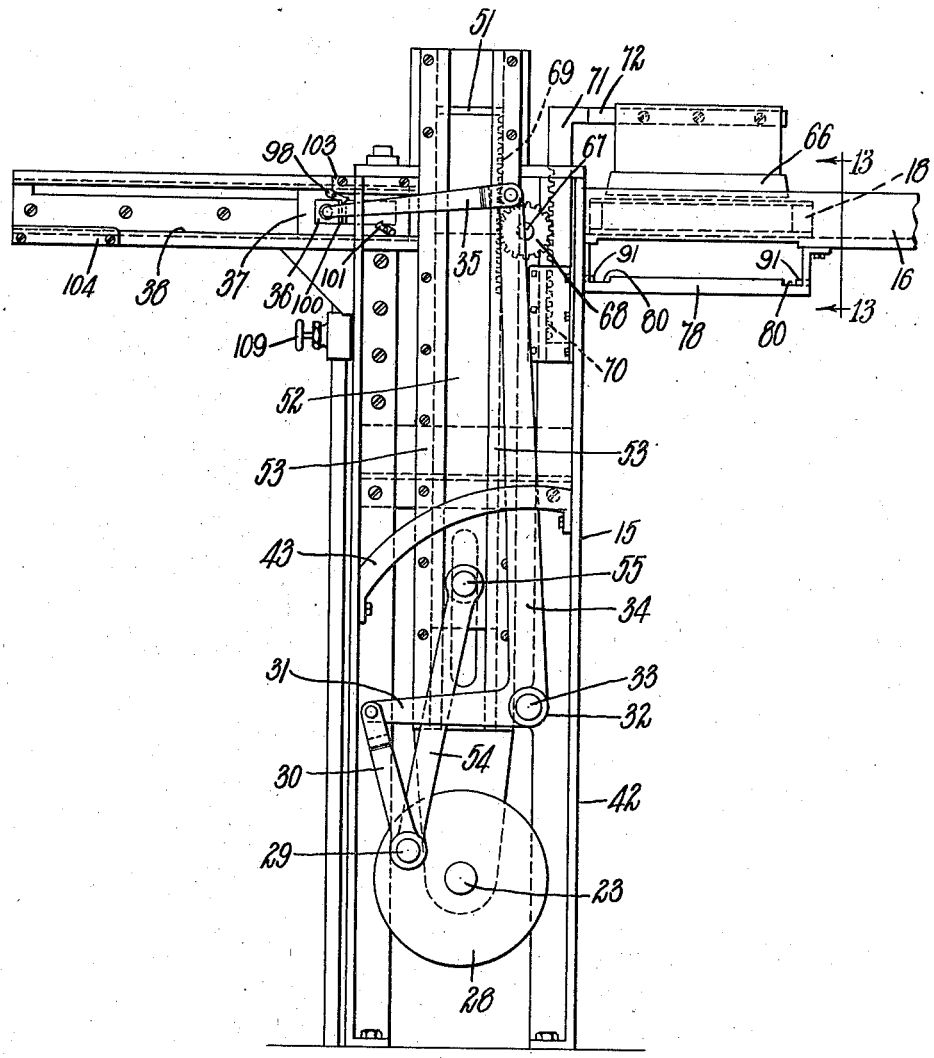
Fig. 3 is a side elevation of the machine with the side plate of the housing removed.

In the drawings, 15 represents a frame of any suitable design and construction, and 16, 16 represent horizontal runways mounted upon opposite sides of said frame and constructed and arranged to support spacing members 17 and a honey comb frame 18 well known in the art, and filled with comb honey 19 as received from the bee hive, see Fig. 2. This honey comb frame 18 and the spacing members 17 which are secured thereto by suitable pins or spurs 17' are placed upon the runways 16 at the left hand end thereof Fig. 1, in front of a bar 20 constituting a feeding member, and it is desired that said frame 18 and said spacing members 17 shall be moved from said position into a position between a horizontal cutting plate 21 and a vertically movable knife 22, where the comb honey is partly cut preparatory to being eventually severed into a plurality of relatively small pieces for use as individual servings.

The mechanism for performing this feeding operation is as follows:—Mounted in suitable bearings provided therefor near the bottom of the frame 15 is a driving shaft 23 rotated by a gear 24 and pinion 25, or any other suitably arranged train of gears, from a motor 26 mounted upon a platform 27 in turn supported upon the frame 15. Fast to each end of the driving shaft 23 is a disk crank 28 which is operatively connected by means of a crank pin 29 and connecting rod 30 to an arm 31 of a bell-crank lever 32 pivotally mounted at 33 upon the frame 15. An arm 34 of the bell-crank lever 32 is operatively connected by means of a connecting rod 35 with an idler slide 36 mounted to slide in a main slide 37 in turn mounted to slide in a guideway 38 provided at the side of the runway 16 and extending parallel thereto. The main slide 37 has an arm 39 formed integral therewith which is adjustably connected to the feeding member 20 for the honey comb frame 18 by means of a clamp screw 40 and adjusting screw 41, see Figs. 9 and 11.

At certain times during the operation of the machine the idler slide 36 is locked to the main slide 37 to move in unison therewith, while at certain other times said idler slide is free to move independently of the main slide. The mechanism for permitting this action of the feeding mechanism will be hereinafter more fully described. All of the feeding mechanism hereinbefore described is duplicated at each side of the machine and is located within a housing 42 at each side of the frame 15. A pair of segmental guard members 43 are provided for the long arm 34 of the bell-crank lever 32, said members being located upon opposite sides of said arm.

After the honey comb frame 18 has been pushed by the feeding mechanism hereinbefore described into a position between the cutting plate 21 and the knife 22, the comb honey 19 in the frame 18 is partly severed into a plurality of relatively small pieces by a mechanism as follows:—The knife 22 as a whole is rectangular in shape and conforms to the shape of a standard honey comb frame in common use, and said knife consists of a plurality of longitudinal blades 44 and a plurality of transverse blades 46. Certain of the blades 44 are slotted at 45 and certain of the blades 46 are slotted at 47 to enable said blades to be interlocked one with another as illustrated in detail in Figs. 6 and 7. The end portions of all of the blades are notched at 48 and the inner blades at their ends hook into the outer or rim blades as illustrated in Fig. 7. The outer or rim blades are secured to a rim 49 by screws 50.

The knife 22 as a whole is secured at its opposite ends to holders 51 mounted at the top of vertical drive slides 52 in turn mounted to reciprocate in vertical guideways 53 at the sides of the frame 15 and within the housings 42. The slides 52 are driven by means of connecting rods 54 which are operatively connected at their lower ends to the crank pins 29 of the crank disks 28 and at their upper ends at 55 to the slides 52.

The holders 51 for the knife 22 are constructed and arranged to support and position said knife within an open tank 56 of hot water 57 which is heated by means of a heater 58 of any desired type, preferably electrical, located directly beneath said tank and supported upon a shelf 59 protected by insulating material 60. The knife 22 is submerged in the hot water 57 at all times except when it is performing the cutting operation, and the water is maintained at a sufficiently high degree of temperature to heat the knife to such an extent that it will easily and effectively penetrate the honey comb without crushing the same, and finally be withdrawn therefrom without breaking down the cells of the honey comb or otherwise injuring the fragile structure thereof. The hot water will furthermore sterilize the knife and also wash the same free of honey which would otherwise tend to cling thereto.

During the forward feeding movement of the honey comb frame 18, said frame is moved into a position upon a pair of flat springs 61 which are secured to the upper face of the runways 16 at the location where the cutting operation upon the comb honey 19 takes place. When the frame 18 is pushed upon the springs 61 the frame is forced upwardly and the upper face of the comb honey is brought into contact with the under face of the cutting plate 21 as illustrated in Fig. 5. The comb honey is then in position to be subjected to the cutting operation during which time the frame 18 is firmly held in position for cutting. The springs 61 will also effectively stop the movement of the frame 18 at the end of its feeding movement.

The knife 22 in cutting the comb honey 19 is forced into the latter from beneath and it is desirable that said knife shall not cut entirely through said comb honey, but that when the knife reaches the limit of its upward stroke that there shall remain an uncut portion approximately one-sixteenth of an inch in thickness, or at least a portion of sufficient strength to hold the partly severed pieces of comb honey from dropping downwardly out of the frame 18 during the subsequent feeding operation of said frame from cutting to discharging position.

It is evident that when the numerous knife blades 44 and 46 are being withdrawn from the comb honey 19 after the cutting operation that there may be a tendency for said blades to pull the partly severed pieces of comb honey downwardly therewith and out of the frame 18. To prevent this possible premature collapse of comb honey a multiple support 62 of novel construction is provided within the tank 56 mounted upon a plate 63 which is attached to the bottom of said tank. The support 62 embodies therein a plurality of hollow supporting units 64, one of which is illustrated in detail in Fig. 8. The units 64 project upwardly from the plate 63 into the spaces between the knife blades 44 and 46, and upwardly curved upper extremities of said units are located in close proximity to the under surface of the comb honey positioned to be cut. The supporting units 64 in cross-sectional contour simulate the form of the spaces between the knife blades and occupy a greater portion of said spaces. The units are submerged in the hot water 57 within the tank 56 and a plurality of apertures 65 are provided in said units to permit of a free circulation of hot water between the units and knife blades at all times when the blades are submerged. When the knife blades 44 and 46 are withdrawn from the comb honey 19 after the cutting operation, the supporting units 64 will prevent the partly severed pieces of comb honey from being pulled downwardly a sufficient amount to break the thin uncut portion of said comb honey.

After the cutting operation upon the comb honey has been completed and the knife blades have been withdrawn therefrom, the frame 18 and the partly severed pieces of comb honey therein remain beneath the cutting plate 21 until said frame is moved forwardly by another frame 18 of uncut comb honey being moved into cutting position at which time the frame containing the uncut honey will engage the spacing members 17 which still remain in position at the rear corners of the frame which is in cutting position and the latter will be moved from between the knife 22 and cutting plate 21 into position beneath an ejector 66 where the partly severed pieces of comb honey will be forced from their frame 18 and entirely severed one from another.

The mechanism for ejecting the pieces of comb honey is as follows:—Mounted upon fixed studs 67 at each side of the frame 15 are pinions 68 which mesh with and are rotated by teeth 69 provided upon the vertical slides 52. The pinions 67 also mesh with teeth 70 provided upon vertical ejector slides 71 mounted in suitable guideways provided upon the frame 15. The ejector 66 is attached at each end thereof to an arm 72 which is formed as a part of the ejector slide 71 and said ejector is provided with a flat working face 73 which engages the upper uncut surface of the comb honey. The face 73 of the ejector is grooved transversely thereof at 74 and longitudinally thereof at 75, said grooves being positioned above incisions 76 and 77 respectively that have been cut in the comb honey.

Mounted beneath the frame of comb honey that is located in ejecting position is a support 78 for a tray 79. The support 78 is secured to the under side of the runways 16 and extends transversely thereof and has guideways 80 provided therein in which runners 81 which are fastened to the bottom of the tray 79 are adapted to slide and be guided through the support. The tray 79 is provided with a removable bottom 82 which rests loosely upon a flange 83 of said tray. An open carton tray 84, as, for example, the bottom member of a paper or pasteboard box, or equivalent receptacle, is located within the tray 79, and located within said receptacle 84 are a plurality of small receptacles 85 of a suitable size to receive separately the individual pieces of comb honey from the frame 18. The receptacles 85 are preferably constructed of waterproofed paper and may be of any desired construction.

To facilitate the transfer of the pieces of comb honey from the frame 18 into the receptacle 85, and, furthermore, to effect the final severing of the partly severed pieces one from another, a separator member 86 is provided mounted upon the upper edge of the tray 79. The member 86 embodies therein a main or outer rim portion 87 constructed and arranged to overlie the top edges of the tray 79 and carton 84, and the top edges of the outer side of the outer rows of receptacles 85, together with intersecting transverse and longitudinal portions 88 which overlie the top edges of the abutting sides of all of the receptacles 85; and all of said overlying portions, furthermore project downwardly a short distance into the receptacles mentioned. In cross-sectional contour the portions 88 of the separator member 86 are approximately an inverted V, the sides of said portions converging upwardly and terminating in a relatively narrow top edge 89 which enters the incisions 76 and 77 in the comb honey as the latter is forced downwardly thereover by the ejector 66, and when the unsevered portions of said honey finally contact with the portions 88 of the separator 86 the partly severed pieces of comb honey are finally severed one from another above the incisions 76 and 77. The separator 86 in addition to functioning to separate the honey at the incisions also functions to guide the pieces of comb honey into their respective receptacles 85, and as the pieces pass through the openings in the separator between the portions 88 thereof the severed edges of the cells of honey comb are bent backwardly in a manner to partly seal the severed cells and prevent excessive dripping of the loose honey from the cells. A gutter 90 extends around the outside edge of the separator 86, and excess honey that may drip from the edge portions of the honey that are severed from the frame 18 will be collected by this gutter.

During the operation of packing the pieces of comb honey into the receptacles 85 the tray 79 is held securely in position to permit the transfer of said pieces from the frame 18 into said receptacle by means of latches 91 located in slots 92 provided upon opposite sides of the support 78 and pivoted thereto at 93. The latches 91 are held in engagement with lugs 94 which project from the opposite sides of the tray 79 adjacent to the rear end thereof by springs 95 which act to force said latches into locking engagement with said lugs. The latches are released from engagement with the lugs 94 by other lugs 96 located upon the opposite sides of the tray 79 adjacent to the front end thereof and adapted to engage a side 97 of the latch 91 which projects into the guideway 80 and into the path of said lugs 96, see Fig. 14. The lugs 96 are of such length that they will not become interlocked with the latches 91. When a tray 79 with empty receptacles 85 therein is being inserted within the support 78 the lugs 96 will engage the sides 97 of the latches 91 and force the latter out of engagement with the lugs 94 thereby permitting the tray 79 having filled receptacles 85 therein to be pushed forwardly through the support 78 and outwardly from the opposite side thereof where said tray is removed by an attendant.

The ejecting operation upon the comb honey located in ejecting position takes place simultaneously with the cutting operation upon the comb honey located in cutting position.

It will be noted from the foregoing description that the feeding mechanism for the frames of comb honey includes the bell-crank levers 32 actuated by means of the cranks 28, and it will be evident that there is no rest period in the movement of said cranks. It will also be noted that the cutting and ejecting mechanism include the slides 52 actuated by the cranks 28. As it is clearly evident that the movement of the bell-crank lever 32 must be rendered ineffective during the cutting operation, and as it is furthermore desirable that there shall also be a prolonged dwell in the movement of the actuating member 20 when the latter is located in its extreme outward position, a mechanism is provided for rendering the movement of the bell-crank levers temporarily ineffective and thereby obtaining the dwells mentioned.

This mechanism is as follows:—

Referring particularly to Figs. 9 and 10, the main slide 37 has a pawl 98 pivotally attached to the outer face thereof at 99, and the idler slide 36 has an angle member 100 constituting a catch fast thereto and positioned to be engaged by the pawl 98. Another pawl 101 is pivotally attached at 102 to the outer face of the main slide 37 and this pawl is also adapted to be engaged by the catch 100. Trip members 103 and 104 are provided for the pawls 98 and 101 respectively, said trip members being attached to the outer face of the guideways 38 where they will contact with said pawls. During the feeding movement of the frame 18, the pawl 98 engages the catch 100 and locks the main slide 37 to the idler slide 36, and the two slides will move in unison until the pawl 98 contacts with the trip member 103 when the pawl 98 will be rocked out of engagement with the catch 100, leaving the idler slide free to move independently of the slide 37 for the full movement of the bell-crank lever 32. At this time the catch 100 will have become engaged with the pawl 101 and the slides 36 and 37 will again be locked together and remain so locked during the return movement of the frame holder 17 to its initial position where the pawl 101 will contact with the trip member 104 to again release the idler slide 36, leaving the latter free to move independently of the slide 37 for the full movement of the upper arm 34 of the bell-crank lever 32 toward the left in Fig. 3. In this manner a prolonged dwell is provided for the frame holder 17 when it is located in both its forward and rearward positions, thereby providing sufficient time for the cutting of the comb honey when the frame 18 is in its forward position, and for inserting another frame in front of the feeding bar 20 when the latter is located in its outward position. The locking mechanism for the slides 36 and 37 is duplicated at each side of the machine.

The front and rear sides of the machine below the runways 16 are enclosed within side plates 105, and a door 106 is provided for one of said plates in order that access may be gained to the inclosed mechanism. Inlet and discharge pipes 107 and 108 respectively are provided for supplying water to the tank 56 and for draining said water therefrom. Valves 109 and 110 are provided for the pipes 107 and 108 respectively.

The general operation of the machine hereinbefore specifically described is as follows:—A frame of comb honey 19 as received from the bee hive is placed upon the runways 16 in front of the feeding bar 20 while the latter is at rest in its extreme outward position at the left hand side of Fig. 1, and spacing members 17 are inserted between the bar 20 and frame 18 at the rear corners of the latter, said spacing members being temporarily attached to the frame by small spurs 17'. The frame 18 is then fed into a position between the stationary cutting plate 21 and the knife 22 while the blades thereof are submerged in the tank 56 of hot water 57. As the frame 18 approaches the cutting position it engages springs 61 which are fastened to the upper surface of the runways 16, whereupon the frame is forced upwardly beneath the cutting plate 21 until the upper surface of the comb honey 19 in said frame contacts with the under surface of said plate. The hot wet knife blades 44 and 46 are then raised from the water within the tank 56 and forced into the comb honey and partly therethrough, said blades being brought to a stop at a point approximately one-sixteenth of an inch below the top surface of the comb honey, thereby leaving an uncut portion of comb honey sufficiently thick to hold the partly severed mass together during the subsequent feeding operation of the frame from cutting to ejecting position.

In withdrawing the knife blades from the comb honey, if there is a tendency for the partly severed pieces of comb honey to move downwardly in unison with the knife blades, the under surfaces of said pieces will contact with the upper extremities of the supports 64 and the latter will prevent the comb honey from being pulled downwardly out of its frame 18. After the knife blades have been withdrawn from the comb honey the frame 18 of partly severed pieces of said honey will remain beneath the cutting plate 21 until another frame 18 of comb honey is fed forwardly into cutting position, at which time the frame in cutting position will be pushed into ejecting position by the second frame and the spacing members 17 located therebetween.

The operation of ejecting the partly severed pieces of comb honey from the frame in ejecting position takes place at the same time that the comb honey in the frame in cutting position is being subjected to the cutting operation, but the movement of the knife blades in cutting the honey is upward, and the movement of the ejector 66 in ejecting the pieces of comb honey is downward.

As the ejector 66 is moved into contact with the uncut upper surface of the comb honey in the frame 18, the unsevered portion thereof that connects the mass of comb honey to said frame is first broken away from the frame and the entire piece of said honey is then forced downwardly out of the frame and into engagement with the separator member 86 which is supported upon the upper edge of the tray 79, in turn supported upon the guideways 80 of the support 78. As the piece of comb honey is forced through the separator member 86, the portions 88 of the latter enter the incisions 76 and 77 previously cut in the under surface of the comb honey, and the partly severed pieces of said honey are guided into the small receptacles 85, and finally separated at the uncut portions thereof above said incisions. The tray 79 with the carton 84 of filled receptacles 85 therein is then pushed through the support 78 by an attendant who, upon inserting another tray 79 containing another carton 84 of empty receptacles 85, causes said latter tray to engage the latches 91 and thereby disengage said latches from the lugs 94 of the filled tray, and the subsequent movement of the empty tray into position to receive the honey will cause the filled tray to be discharged from the machine.

After removing the separator member 86 from the tray containing the filled receptacles 85, the carton 84 containing said receptacles is removed from the tray by forcing the removable bottom 82 of said tray upwardly. Suitable covers may then be applied to the receptacles 85 and to the carton 84, if desired.

During the operation of the machine rest periods are provided in the operation of the feeding mechanism by disconnecting the slides 36 and 37 one from another in a manner to permit the slide 37 carrying the feeding member 20 to come to a stop while allowing the slide 36 to move idly on the slide 37.

It is evident that the water in the tank 56 may be heated at a point remote from said tank and delivered thereto if it is so desired, and that said hot water will not only constitute an effective means for heating the knife 22, but will also sterilize the blades and wash the same free of loose honey.

I claim:

1. A machine for cutting comb honey comprising, in combination, a frame, means to feed a piece of comb honey into cutting position upon said frame, a heating medium, a knife exposed to said heating medium, means to raise said knife to cut said comb honey, and means to engage the comb honey between incisions therein while the knife is being withdrawn downwardly therefrom and thereby prevent movement of the comb honey in unison with the knife.

2. A machine for cutting comb honey comprising, in combination, a frame, means to feed a piece of comb honey into cutting position upon said frame, a heating medium, a knife exposed to said heating medium, means to raise said knife to cut said comb honey, means to engage the comb honey between incisions therein while the knife is being withdrawn downwardly therefrom and thereby prevent movement of the comb honey in unison with the knife, and means to force apart and separate the cut portions of comb honey.

3. A machine for cutting comb honey comprising, in combination, a frame, means to feed a piece of comb honey into cutting position upon said frame, a heating and cleansing medium, a knife exposed to said heating and cleansing medium, means to actuate said knife to partly sever said comb honey into pieces, means to support the comb honey between the incisions therein while the knife is being withdrawn therefrom, and means to separate the comb honey at said incisions.

4. A machine for cutting comb honey comprising, in combination, a runway, means to feed a frame of comb honey into cutting position upon said runway, a knife embodying therein a plurality of blades, means to raise said knife to cut said comb honey, and means to support the comb honey between the knife blades while the latter are being withdrawn downwardly therefrom.

5. A machine for cutting comb honey comprising, in combination, a runway, means to feed a frame of comb honey into cutting position upon said runway, a knife embodying therein a plurality of blades, means to actuate said knife to cut said comb honey, means to support the comb honey between the knife blades while the latter are being withdrawn therefrom, and means to eject the cut portions of comb honey from their frame and separate adhering pieces thereof after the cutting operation.

6. A machine for cutting comb honey comprising, in combination, a runway, means to feed a frame of comb honey into cutting position upon said runway, a knife embodying therein a plurality of blades, means to actuate said knife to partly sever said comb honey into pieces, means to support the comb honey between incisions therein while the knife is being withdrawn therefrom, and means to finally sever the unsevered portions of the comb honey at said incisions.

7. A machine for cutting comb honey comprising, in combination, a runway, means to feed a frame of comb honey into cutting position upon said runway, a knife embodying therein a plurality of blades, means to actuate said knife to partly sever said comb honey into pieces, means to hold the comb honey within its frame while the knife is being withdrawn therefrom, and means to eject the comb honey from its frame and sever said honey at said incisions.

8. A machine for cutting comb honey comprising, in combination, a runway, means to feed a frame of comb honey into cutting position upon said runway, a container for a heating fluid, a knife embodying therein a plurality of blades exposed to said heating fluid, means to actuate said knife to cut said comb honey within its frame, means to hold the comb honey within its frame while the knife is being withdrawn therefrom, and means to eject the comb honey from its frame and separate adhering cut portions thereof.

9. A machine for cutting comb honey comprising, in combination, a runway, means to feed a frame of comb honey into cutting position upon said runway, a container for a heating fluid, a knife embodying therein a plurality of blades exposed to said heating fluid, means to actuate said knife to cut said comb honey within its frame, said frame being moved out of cutting position by another frame moving into cutting position, and means to eject the comb honey from its frame and separate adhering cut portions thereof.

10. A machine for cutting comb honey comprising, in combination, a runway, means to feed a frame of comb honey into cutting position upon said runway, a container for a heating fluid, a knife embodying therein a plurality of blades exposed to said heating fluid, means to actuate said knife to partly sever said comb honey into pieces within its frame, means to support the comb honey between incisions therein while the knife is being withdrawn therefrom, and means to eject the partly severed pieces of comb honey from their frame and separate the pieces at said incisions.

11. A machine for cutting comb honey comprising, in combination, a runway, means to feed a frame of comb honey into cutting position upon said runway, a container for a heating and cleansing fluid, a knife embodying therein a plurality of blades exposed to said heating and cleansing fluid, means to actuate said knife to partly sever said comb honey into pieces within its frame, means to support the comb honey between incisions therein while the knife is being withdrawn therefrom, and means to eject the partly severed pieces of comb honey from the frame, entirely separate said pieces one from another and deposit the pieces in a receptacle.

12. A machine for cutting comb honey comprising, in combination, a runway, means to feed a frame of comb honey into cutting position upon said runway, a tank of hot water, a knife embodying therein a plurality of blades submerged in said water, means to actuate said knife to cut said comb honey within its frame, means to hold the comb honey within its frame while the knife is being withdrawn therefrom, and means to eject the comb honey from its frame and separate adhering cut portions thereof.

13. A machine for cutting comb honey comprising, in combination, a runway, means to feed a frame of comb honey into cutting position upon said runway, a tank of hot water, a knife embodying therein a plurality of blades submerged in said water, means to actuate said knife to partly sever said comb honey into pieces, means positioned between the knife blades to support the comb honey between incisions therein while the knife is being withdrawn therefrom, and means to eject the partly severed pieces of comb honey from their frame and separate the pieces at said incisions.

14. A machine for cutting comb honey comprising, in combination, a runway, means to feed a frame of comb honey into cutting position upon said runway, a tank of hot water, a knife embodying therein a plurality of blades submerged in said water, means to raise said knife from said hot water into cutting contact with said comb honey, means also submerged in said hot water between said knife blades to support the comb honey between the incisions therein while the knife is being withdrawn therefrom, and means to eject the comb honey from its frame and separate the cut portions one from another.

15. A machine for cutting comb honey comprising, in combination, a runway, means including a main slide and an auxiliary slide at each side of the runway to feed a frame of comb honey upon said runway into cutting position, means to lock said main and auxiliary slides one to another to move in unison, means to release said locking means whereby the auxiliary slides may move independently of the main slides, a tank of hot water, a knife embodying therein a plurality of blades submerged in said water, means to raise said knife from said hot water into cutting contact with said comb honey, means also submerged in said hot water to support the comb honey between incisions therein while the knife is being withdrawn therefrom, and means to eject the comb honey from its frame and separate the cut portions thereof one from another.

16. A machine for cutting comb honey comprising, in combination, a runway, a stationary cutting plate, means including a main slide and an auxiliary slide at each side of the runway to feed a frame of comb honey upon said runway into position beneath said cutting plate, means to lift said frame to contact the honey therein with said plate, means to lock said main and auxiliary slides one to another to move in unison, means to release said locking means whereby the auxiliary slides may move independently of the main slides to provide dwells in the movement of the honey comb frame, a tank of hot water, a knife embodying therein a plurality of blades submerged in said water, means to raise said knife from said hot water into cutting contact with the comb honey, means also submerged in the hot water to support the comb honey between incisions therein while the knife is being withdrawn therefrom, and means to eject the partly severed pieces of comb honey from said frame and deposit said honey in a receptacle.

17. A machine for cutting comb honey comprising, in combination, a runway, means to feed a frame of comb honey into cutting position upon said runway, a tank of hot water, a knife submerged in said water, means to actuate said knife to cut said comb honey within its frame, means to hold the comb honey within its frame while the knife is being withdrawn therefrom, said frame being moved out of cutting position by another frame moving into cutting position, a separator, and means to eject the honey from the frame and force the same through said separator, whereby pieces of said honey are divided one from another and guided into a tray.

18. A machine for cutting comb honey comprising, in combination, a runway, means to feed a frame of comb honey upon said runway into cutting position, a tank of hot water, a knife submerged in said water, means to actuate said knife to partly sever said comb honey into pieces, means to support the comb honey between incisions therein while the knife is being withdrawn therefrom, said frame being moved out of cutting position by another frame moving into cutting position, a tray, a separator above said tray, and means to eject the comb honey from the frame and force the partly severed pieces thereof through said separator, whereby the unsevered portions are separated and the pieces are guided into the tray.

19. A machine for cutting comb honey comprising, in combination, a runway, means to feed a frame of comb honey upon said runway into cutting position, a tank of hot water, a knife submerged in said water, means to actuate said knife to partly sever said comb honey into pieces, means to support the comb honey between incisions therein while the knife is being withdrawn therefrom, said frame being moved out of cutting position by another frame moving into cutting position, a tray, means to lock said tray in position to receive the honey, a separator mounted upon the tray, and means to eject the partly severed pieces of comb honey from the frame and force said pieces through said separator, whereby said pieces are entirely separated one from another and guided into receptacles located in said tray.

20. A machine for cutting comb honey comprising, in combination, a runway, means to feed a frame of comb honey upon said runway into cutting position, a tank of hot water, a knife submerged in said water, means to actuate said knife to make incisions in said honey, means to support the comb honey between said incisions while the knife is being withdrawn therefrom, said frame being moved from cutting to ejecting position by said feeding means, a support having guideways embodied therein, a tray, means to lock said tray to said support upon said guideways in position to receive the honey, a separator mounted upon the tray and having guide portions embodied therein, and means to eject the honey from the frame and force the same through said guide portions of said separator, whereby the honey is separated and the pieces thereof guided into receptacles located in said tray.

ARNOLD PERRETON.